United States Patent [19]
Peters et al.

[11] B 3,986,768
[45] Oct. 19, 1976

[54] CENTER COOLED LASER MIRROR

[75] Inventors: Laurence R. Peters, Peoria; William E. Streight, East Peoria, both of Ill.

[73] Assignee: Caterpillar Tractor Co., Peoria, Ill.

[22] Filed: Nov. 4, 1974

[21] Appl. No.: 520,543

[44] Published under the second Trial Voluntary Protest Program on January 27, 1976 as document No. B 520,543.

[52] U.S. Cl. ............................. 350/310; 350/288
[51] Int. Cl.² ......................................... G02B 5/08
[58] Field of Search ................... 350/288, 3, 310; 331/94.5 D, 94.5 T; 165/168–170

[56] References Cited
UNITED STATES PATENTS

| | | | |
|---|---|---|---|
| 3,488,110 | 1/1970 | Evoy | 350/310 X |
| 3,817,606 | 6/1974 | Locke et al. | 350/310 |
| 3,861,787 | 1/1975 | Locke et al. | 350/310 X |

*Primary Examiner*—Alfred E. Smith
*Assistant Examiner*—F. L. Evans
*Attorney, Agent, or Firm*—Phillips, Moore, Weissenberger Lempio & Strabala

[57] ABSTRACT

A fluid cooled laser mirror includes a body defining internal chamber means made up of inner and outer chambers generally separated by a wall defined by the body. An inlet port communicates with the inner chamber, and outlet ports communicate with the outer chamber. The wall defines a plurality of passages therethrough, allowing communication between the inner and outer chambers, so that cooling fluid may flow into the center of the body in the inner chamber, through the passages of the wall, into the outer chamber, and from the outlet ports. Vanes are appropriately placed to properly direct and guide cooling fluid so that it cools in a highly efficient manner.

8 Claims, 2 Drawing Figures

CENTER COOLED LASER MIRROR

BACKGROUND OF THE INVENTION

This invention relates to mirrors, and more particularly, to fluid cooled mirrors utilized in laser systems.

The present invention is directed toward providing a fluid cooled mirror for focusing or deflecting a concentrated beam of electromagnetic energy. It is to be understood that such a beam, having either a continuous energy distribution across the beam, or a tightly focused annular energy distribution, is generally directed to and reflected from the central portion of a mirror. While it is to be noted that the fluid cooled mirror system of U.S. Pat. application Ser. No. 478,540 (assigned to the assignee of this invention) is extremely effective for the purpose provided, there exists in such mirror system a relatively solid portion at the center thereof, resulting in the fact that heat absorption at such center will be relatively high, and heat transfer therefrom relatively low.

Of more general interest in this area are U.S. Pat. No. 3,637,296 to McLafferty et al., U.S. Pat. No. 3,731,992 to Mansell, U.S. Pat. No. 3,781,094 to Griest, and U.S. Pat. No. 3,836,236 to Kirk et al.

SUMMARY OF THE INVENTION

It is accordingly an object of this invention to provide a laser mirror apparatus which provides for extremely effective cooling adjacent the center thereof.

It is still a further object of this invention to provide a fluid-cooled laser mirror which, while fulfilling the above object, provides for generally uniform, effective and efficient cooling of the mirror apparatus, meanwhile being highly reliable in operation and economical for production.

Broadly stated, the invention comprises a mirror apparatus comprising body means defining a reflective surface. Body means define internal chamber means, the body further defining a wall which substantially divides the chamber means into a first, inner chamber position generally centrally of the reflective surface, and a second chamber positioned generally about the first chamber, the wall means defining passage means therethrough for providing communication between the first and second chambers. The body means define first port means communicating with the first chamber, and second port means communicating with the second chamber. A fluid can flow through one of the first and second port means, into the chamber communicating therewith, through the wall passage means, into the chamber communicating with the other of the first and second port means, and through the other of the first and second port means.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
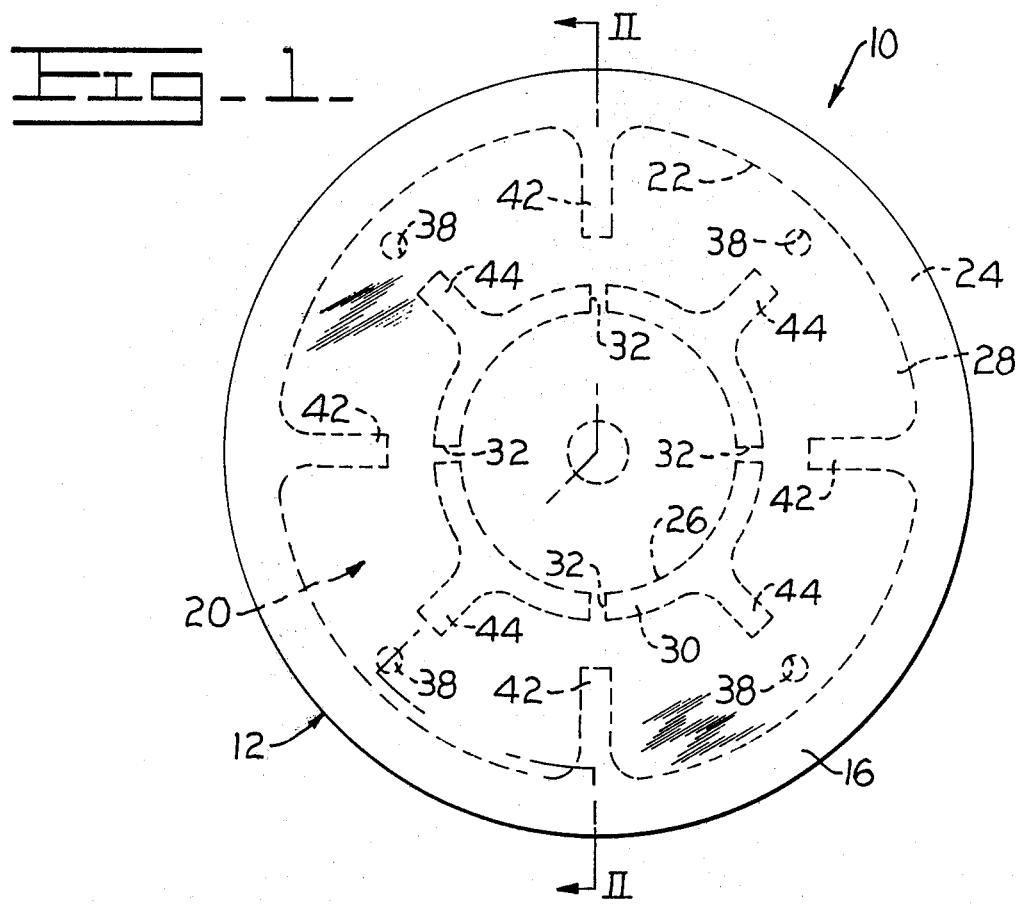
FIG. 1 is a plan view of the fluid-cooled mirror of the invention with a portion thereof broken away.

As shown in the drawings, a mirror apparatus is generally indicated at 10. The mirror apparatus 10 is made up of a body 12 which in turn includes an annular base plate 14 secured to a rearward axial end of an annular body member 16. The body member 16 includes a highly polished reflective surface 18 on the side spaced from the base plate 14. The body member 16 is constructed of a material selected to supply high thermal conductivity and low absorption of electromagnetic energy beams reflected thereby.

The base plate 14 and body member 16 of the body 12 together define chamber means 20 internally of the body 12, the outer portion of the chamber means 20 being defined by the inner surface 22 of an outer peripheral wall 24. The chamber means 20 are substantially divided into inner and outer chambers 26,28, by means of a wall 30 defined by body member 16. Such wall 30 is generally annular in configuration, and defines gaps or passages 32 therethrough for providing communication between the chambers 26,28. The inner chamber 26 is positioned generally centrally of the reflective surface 18, and the chamber 28 is positioned about the chamber 26.

The base plate 14 defines a centrally disposed inlet port 34 communicating wih a supply conduit 36 and a plurality of individual outlet ports 38 disposed adjacent the surface 22 of the peripheral wall 24, and communicating with exhaust conduits 40. Port 34 communicates with the chamber 26, and such individual ports 38 each communicate with the chamber 28.

The body member 16 defines a plurality of vanes 42, each extending inwardly from the outer peripheral wall 24 into the chamber 28, and terminating adjacent a passage 32 defined by the wall 30. The body member 16 defines another plurality of vanes 44, each extending outwardly from the wall 30 and terminating adjacent one of the individual ports 38.

It is to be seen that the vanes 42 are radially disposed and are substantially equally spaced apart, as are the vanes 44. Each vane 44 extends between an adjacent pair of vanes 42, and is in fact positioned substantially midway between an adjacent pair of vanes 42. Similarly, each passage is positioned substantially midway between an adjacent pair of vanes 44.

Figure 2:
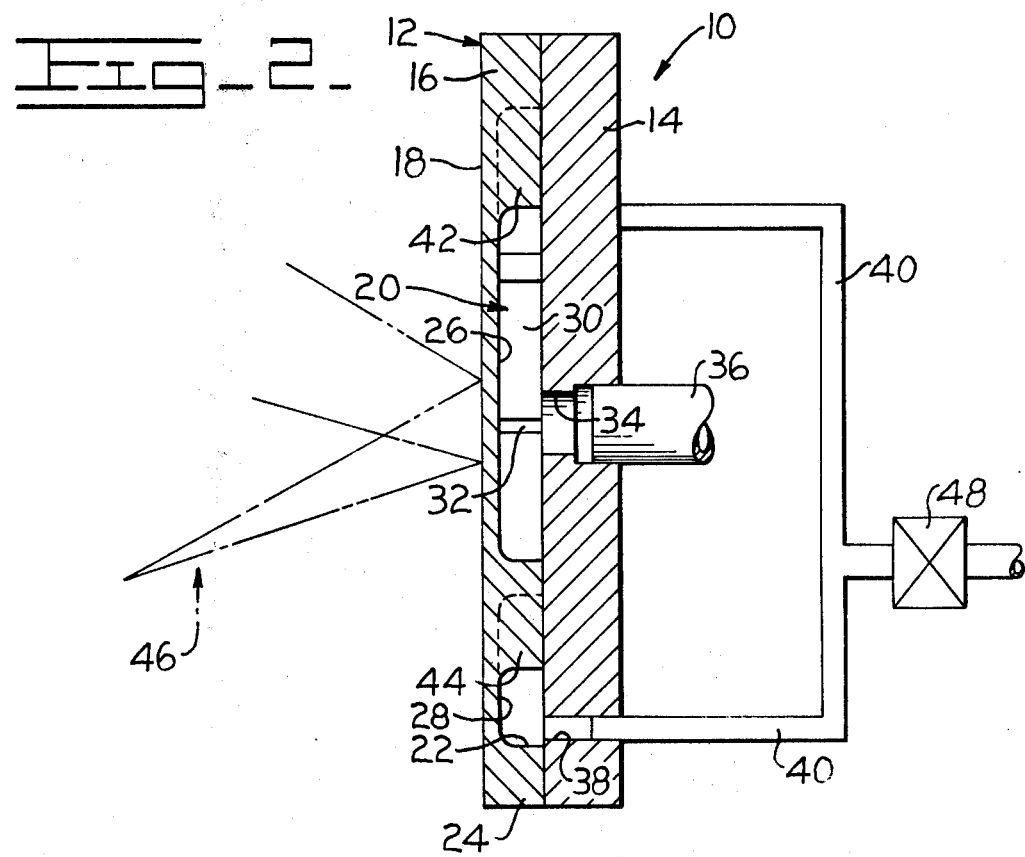
FIG. 2 is a sectional view taken along the line II—II of FIG. 1.

In operation, a laser beam 46 having a solid or tightly focused energy distribution across a section of the beam, as indicated in FIG. 2, strikes a central region of the reflective mirror surface 18 of the body member 16 at a slight angle, and is reflected therefrom in the usual manner. Liquid coolant enters the chamber 26 through the supply conduit 36 and inlet port 34 and takes on heat from the mirror surface 18. The heated fluid is then discharged equally through each of the passages 32 into the chamber 28. The flow of fluid through each of the passages 32 is divided substantially equally by one of the vanes 42, and, is subsequently directed toward the outlet ports 38 and discharged through exhaust conduits 40. A flow control valve 48 is positioned in the exhaust conduits 40 to provide flow control of the cooling fluid. The supply conduit 26 and inlet port 34 are sized to provide a greater volume flow of fluid than that capable of being exhausted through the control valve 48, thereby assuring the chamber means 20 made up of chambers 26,28 will be properly filled with fluid at all times.

It will be seen that because of the particular positioning of the chamber 26, extremely highly efficient cooling of the central portion of the mirror apparatus 10 is provided. The particular design of the wall 30 and vanes 42,44 result in the fact that the cooling fluid is properly distributed to provide even cooling to all portions of the mirror apparatus 10.

What is claimed is:

1. A mirror apparatus comprising:

body means defining a reflective surface, and further defining internal chamber means, the body means further defining a wall which substantially divides the chamber means into a first, inner chamber positioned generally centrally of the reflective surface, and a second chamber positioned about the first chamber, the wall means defining passage means therethrough for providing communication between the first and second chambers;

said body means defining first port means communicating with the first chamber, and second port means communicating with the second chamber;

whereby a fluid can flow through one of the first and second port means, into the chamber communicating therewith, through the wall passage means, into the chamber communicating with the other of first and second port means, and from the other of the first and second port means.

2. The apparatus of claim 1 wherein the first port means comprise inlet port means, and the second port means comprise outlet port means.

3. The apparatus of claim 1 wherein the wall defines passage means comprising a plurality of individual passages, said body means defining a plurality of vanes extending inwardly into the second chamber, and terminating adjacent a passage defined by the wall.

4. The apparatus of claim 1 wherein the second port means comprise a plurality of individual ports, and wherein the body means define a second plurality of vanes extending outwardly into the second chamber and terminating adjacent one of the individual ports.

5. The apparatus of claim 2 wherein the wall defines passage means comprising a plurality of individual passages, said body means defining a plurality of vanes extending inwardly into the second chamber, and terminating adjacent a passage defined by the wall.

6. The apparatus of claim 5 wherein the second port means comprise a plurality of individual ports, and wherein the body means define a second plurality of vanes extending outwardly into the second chamber and terminating adjacent one of the individual ports.

7. The apparatus of claim 6 wherein each of the second vanes extends between an adjacent pair of first-mentioned vanes.

8. The apparatus of claim 7 wherein the first vanes are substantially radially disposed, and substantially equally spaced, and wherein the second vanes are substantially radially disposed and substantially equally spaced, with each of the second vanes being positioned substantially midway between an adjacent pair of first vanes.

* * * * *